United States Patent [19]

Takimoto

[11] Patent Number: 4,796,128
[45] Date of Patent: Jan. 3, 1989

[54] ROTARY HEAD TYPE REPRODUCING APPARATUS

[75] Inventor: Hiroyuki Takimoto, Kanagawa, Japan

[73] Assignee: Canon Kabushiki Kaisha, Tokyo, Japan

[21] Appl. No.: 884,759

[22] Filed: Jul. 11, 1986

[30] Foreign Application Priority Data

Jul. 11, 1985 [JP] Japan .................. 60-153022

[51] Int. Cl.$^4$ .................................. H04N 5/783
[52] U.S. Cl. .................................. 360/10.3; 360/21; 360/64; 360/84
[58] Field of Search ............ 360/21, 64, 10.1, 10.3, 360/10.2, 84; 358/328

[56] References Cited

U.S. PATENT DOCUMENTS

| | | | |
|---|---|---|---|
| 4,197,562 | 4/1980 | Kikuya | 360/64 |
| 4,293,880 | 10/1981 | Tsukada | 360/64 |
| 4,603,360 | 7/1986 | Fujiki | 360/84 |
| 4,680,648 | 7/1987 | Takayama | 360/10.2 |

Primary Examiner—Alan Faber
Attorney, Agent, or Firm—Robin, Blecker & Daley

[57] ABSTRACT

A rotary head type reproducing apparatus for reproducing information signals recorded in a plurality of recording tracks by tracing, with rotary type magnetic heads, the recording tracks which are formed on a tape-shaped magnetic record bearing medium in a direction of crossing the longitudinal direction of the medium comprises: pairs of magnetic heads which are positioned in the vicinity of each other with each pair of heads arranged to have different azimuth angles from each other; a rotary member arranged to have the pairs of magnetic heads mounted on the circumference thereof; rotation period detecting means arranged to detect the rotation period of the rotary member and to produce a rotation period information signal corresponding to the rotation period detected; and output selection means for selectively producing, according to the rotation period information signal, the information signals reproduced from the recordng tracks by the pairs of magnetic heads through their tracing action on the tape-shaped magnetic record bearing medium.

32 Claims, 4 Drawing Sheets

ROTARY HEAD TYPE REPRODUCING APPARATUS

BACKGROUND OF THE INVENTION

1. Field of the Invention

This invention relates to a rotary head type reproducing apparatus and more particularly to an apparatus for reproducing, by means of rotary heads, recorded signals from a group of recording tracks which are formed on a tape-shaped record bearing medium obliquely relative to the longitudinal direction of the tape-shaped medium.

2. Description of the Related Art

The conventional apparatus of the kind mentioned above includes video tape recorders (hereinafter referred to as VTR's). To prevent noises from appearing on a reproduced picture in carrying out so-called slow motion reproduction with the VTR, the following method has been employed: A capstan motor is quickly and repetitively started and stopped to intermittently feed the tape and thus to bring the tape into an ideal stopping position in such a manner as to carry out a still picture reproduction and normal reproduction in a given ratio for slow motion reproduction. In order to intermittently feed the tape in this manner, however, the generating torque of a capstan motor which drives the tape to travel must be large enough for starting and stopping the tape within sufficiently short periods of time. Besides, the large torque of the capstan motor has been apt to damage the tape in starting and stopping it. Further, a load imposed on the tape by the generating torque of the capstan motor causes uneven rotation of a drum motor, which results in so-called lateral blurring of a reproduced picture. This necessitates an additional circuit for electrical suppression of the lateral blurring. In addition to these problems, such a condition tends to seriously damage the heads and make the travel of the tape unstable.

SUMMARY OF THE INVENTION

It is a general object of this invention to provide a rotary head type reproducing apparatus which is capable of solving the problems mentioned above.

It is a more specific object of this invention to provide a rotary head type reproducing apparatus which is capable of obtaining adequately reproduced signals with simple structural arrangement from a tape-shaped record bearing medium irrespective of the travelling speed of the tape-shaped record bearing medium.

To attain this object, a rotary head type reproducing apparatus arranged according to this invention to reproduce information signals recorded in a plurality of recording tracks by tracing, with rotary type magnetic heads, the recording tracks which are formed on a tape-shaped magnetic record bearing medium in a direction of crossing the longitudinal direction of the medium comprises: pairs of magnetic heads which are positioned in the vicinity of each other with each pair of heads arranged to have different azimuth angles from each other; a rotary member arranged to have the pairs of magnetic heads mounted on the circumference thereof; rotation period detecting means arranged to detect the rotation period of the rotary member and to produce a rotation period information signal corresponding to the rotation period detected; and output selection means for selectively producing, according to the rotation period information signal, the information signals reproduced from the recording tracks by the pairs of magnetic heads through their tracing action on the tape-shaped record bearing medium.

It is another object of this invention to provide a rotary head type reproducing apparatus which is capable of adequately reproducing information signals recorded in recording tracks formed on a tape-shaped record bearing medium even in cases where the recording tracks have varied widths without recourse to any complex arrangement.

To attain that object, a rotary head type reproducing apparatus arranged according to this invention to reproduce information signals from recording tracks by tracing with rotary type magnetic heads a tape-shaped magnetic record bearing medium on which the recording tracks are formed in the direction of crossing the longitudinal direction of the medium with the information signals at least either in the form of normal recording tracks or in the form of long-time recording track having a narrower width than the normal recording tracks in the direction perpendicular to the longitudinal direction of the tracks comprises: a rotary member which is arranged to be rotatable; two normal-recording-track reproducing magnetic heads which are mounted on the circumference of the rotary member and are arranged back to back deviating 180 degrees from each other; two long-time-recording-track reproducing magnetic heads which are mounted also on the circumference of the rotary member being arranged back to back deviating 180 degrees from each other and are positioned closer to the two normal-recording-track reproducing magnetic heads respectively; medium travel driving means for causing the tape-shaped record bearing medium to travel in the longitudinal direction thereof; and output selection means arranged to select either the normal-recording-track reproducing magnetic heads or the long-time-recording-track reproducing magnetic heads, when the tape-shaped magnetic record bearing medium is driven by the medium travel driving means to travel at such a speed that either the normal-recording-track reproducing heads or the long-time-recording-track reproducing heads are caused to trace the tape-shaped medium across or traversing a plurality of these recording tracks, and to allow the information signals which are recorded in the recording tracks on the medium and reproduced by the selected magnetic heads to be produced as a reprouced signal.

The above and further objects and features of this invention will become apparent from the following detailed description of embodiments thereof taken in connection with the accompanying drawings.

DETAILED DESCRIPTION OF THE PREFERRED EMBODIMENT

Figure 1A:
FIGS. 1(A) and 1(B) schematically show the head allocation of a VTR arranged according to this invention as an embodiment thereof.
Figure 1B:
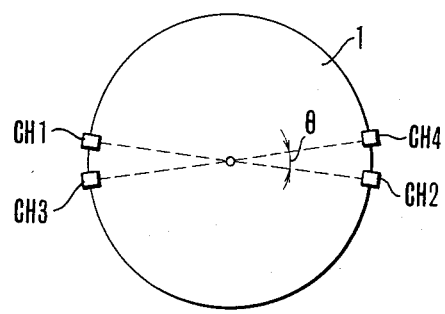
Figure 2:
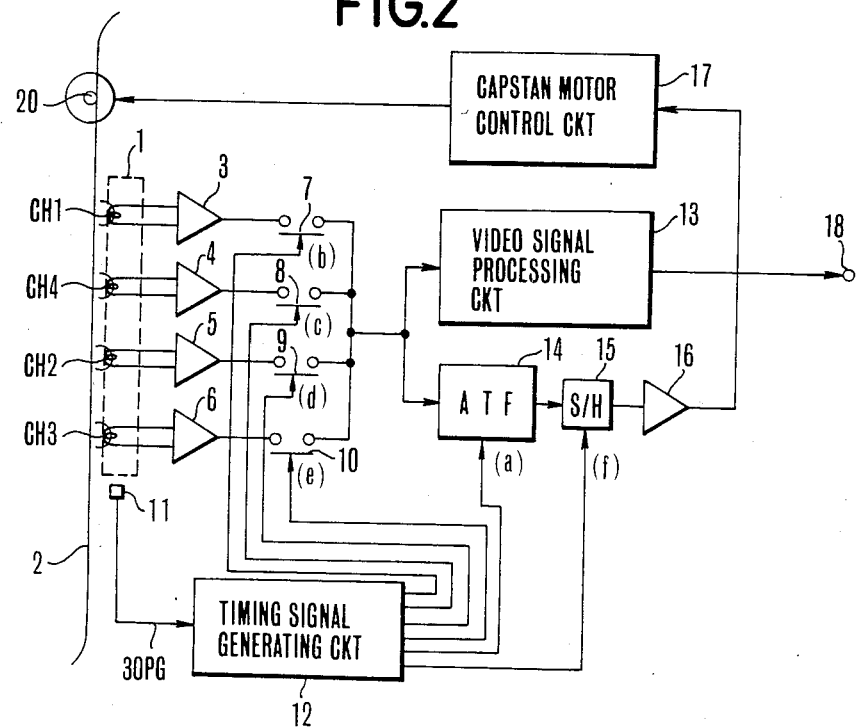
FIG. 2 is a diagram showing in outline the circuit arrangement of the reproduction system of the same VTR.

A preferred embodiment of this invention is arranged as described below:

In this case, the invention is applied to a VTR. FIGS. 1(A) and 1(B) show the way in which the heads of the VTR are allocated. FIG. 2 shows in outline the circuit arrangement of the reproduction system of the VTR. Referring to FIGS. 1(A) and 1(B), heads CH1 and CH2 are arranged to record signals while forming recording tracks in a normal width and to reproduce signals from the tracks in a normal manner. Heads CH3 and CH4 are arranged to record signals while forming recording tracks in a width narrower than the normal track width and to reproduce the recorded signals from these narrower tracks. Assuming that the VTR of this embodiment is a socalled 8 mm VTR arranged to handle signals according to the NTSC system, the normal or standard width of the recording tracks is set at about 20 $\mu$m and the narrow width of tracks at about 10 $\mu$m. Accordingly, the heads CH1 and CH2 are arranged, for example, to give a recording track width of about 28 $\mu$m and the heads CH3 and CH4 a track width about 15 $\mu$m.

As shown in FIG. 1(B), the wider heads CH1 and CH2 are fixedly mounted on a rotary drum 1 at a phase difference of 180 degrees between them and have different azimuth angles from each other. The narrower heads CH3 and CH4 are also fixedly mounted on the rotary drum 1 at a phase difference of 180 degrees between them. As shown in FIG. 1(A), the wider and narrower heads which differ in azimuth angle from each other are located in the vicinity of each other. In other words, the heads CH1 and CH3 are positioned close to each other while the heads CH2 and CH4 are positioned also close to each other. Referring to FIG. 1(B), these closely arranged heads are positioned on the rotary drum 1 at a phase difference $\theta$ in such a manner that they trace the tape at different timings deviating from each other to a degree corresponding to an nH portion of a video signal (n: a natural number and H: a horizontal scanning period).

Referring to FIG. 2, the illustration includes reproduction amplifiers 3, 4, 5 and 6; switches 7, 8, 9 and 10; and a rotation detector 11 which detects the rotation of the rotary drum 1. The output of the detector 11 which is a rectangular wave signal of 30 Hz (hereinafter referred to as 30 PG signal) is supplied to a timing signal generating circuit 12. The circuit 12 generates timing signals (a), (b), (c), (d), (e) and (f) as shown in FIG. 2 according to the 30 PG signal.

The VTR performs normal reproduction as follows: In this instance, signals recorded in the wider tracks on the tape are reproduced by the heads CH1 and CH2. The switches 7 and 9 turn on in succession every time the heads CH1 and CH2 turn round 180 degrees to give a continuous signal. Meanwhile, signals recorded in the narrower tracks are reproduced by the heads CH3 and CH4. The switches 8 and 10 then turn on in succession likewise to give a continuous signal.

The continuous signal thus obtained is supplied to a video signal processing circuit 13 to undergo a known signal processing operation. Then, a reproduced video signal is produced from a terminal 18. In the case of an 8 mm VTR, as well known, pilot signals for tracking control are superimposed on the video signal. Therefore, while the reproduced video signal is thus produced, an automatic track finding circuit 14 (hereinafter referred to as ATF circuit for short) produces a tracking error signal by using the pilot signals which are also reproduced along with the video signal. In accordance with this tracking error signal (hereinafter referred to as ATF signal), a capstan motor control circuit 17 operates to control a capstan motor which is not shown. The rotation phase of a capstan 20 is thus controlled by the circuit 17. In that instance, a sample-and-hold circuit 15 (hereinafter referred to as S/H circuit) either samples or does not sample the ATF signal at every field period of the video signal and the ATF signal is supplied to the capstan motor control circuit 17 via an amplifier 16.

Figure 3:
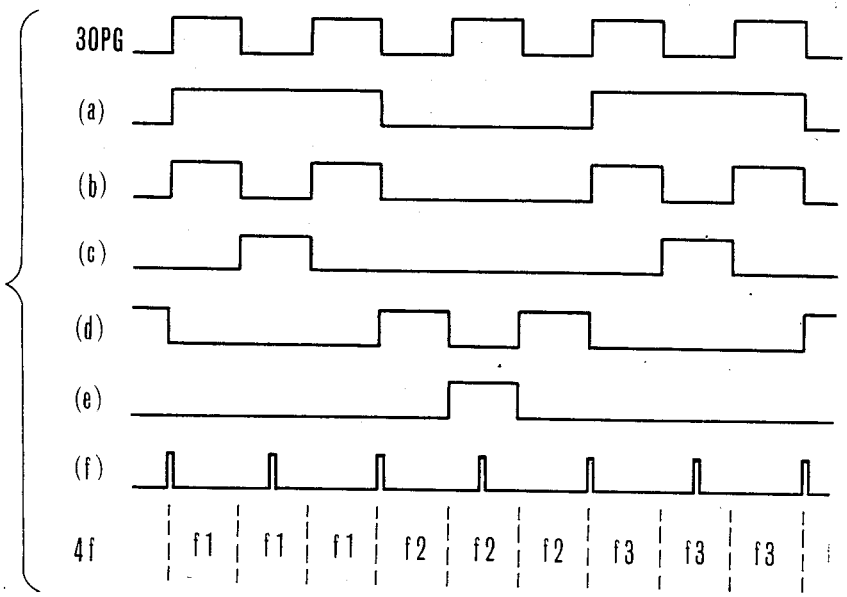
FIG. 3 is a timing chart showing the wave forms of signals obtained at various parts of FIG. 2.

In the event of a slow motion reproducing operation to be carried out at a tape speed which is $\frac{1}{3}$ of the normal speed of tape travel (hereinafter referred to as $\frac{1}{3}$ slow reproduction), the VTR operates as follows: FIG. 3 is a timing chart showing the wave forms of the signals of various parts of FIG. 2 obtained when the $\frac{1}{3}$ slow reproduction is performed on the signals recorded in the wider recording tracks on the magnetic tape. In FIG. 3, a part (a) shows a timing signal obtained by frequency dividing the 30 PG signal by $\frac{1}{3}$. This signal (a) is supplied to the ATF circuit 14. At the ATF circuit 14, the pilot signals reproduced along with the video signal by the heads are subjected to a multiplying operation in a known manner one after another together with reference signals of the same frequencies as those of the pilot signals recorded in the applicable recording tracks. The above-stated timing signal (a) is used for control over a switching timing from one reference signal of one frequency value over to another reference signal of a different frequency value. At a part 4f in FIG. 3, reference symbols f1, f2, f3 and f4 denote the different frequencies of these reference signals. Among the outputs of the timing signal generating circuit 12, the timing signals (b), (c), (d) and (e) are arranged to control the connecting positions of the switches 7, 8, 9 and 10. Another timing signal (f) is arranged to provide the S/H circuit 15 with sampling pulses.

Figure 4:
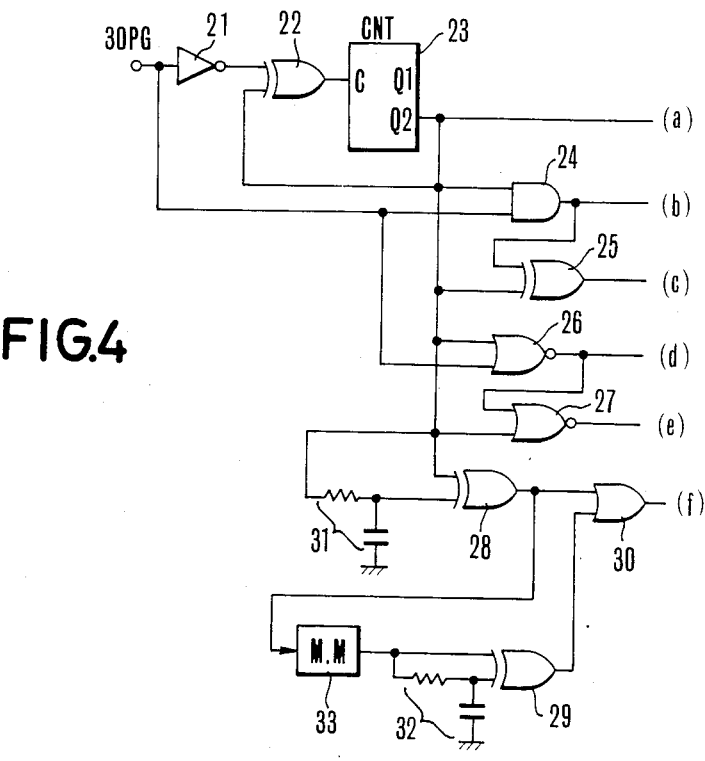
FIG. 4 is a diagram showing the details of a timing signal generating circuit included in the VTR of FIG. 2.
Figure 5:
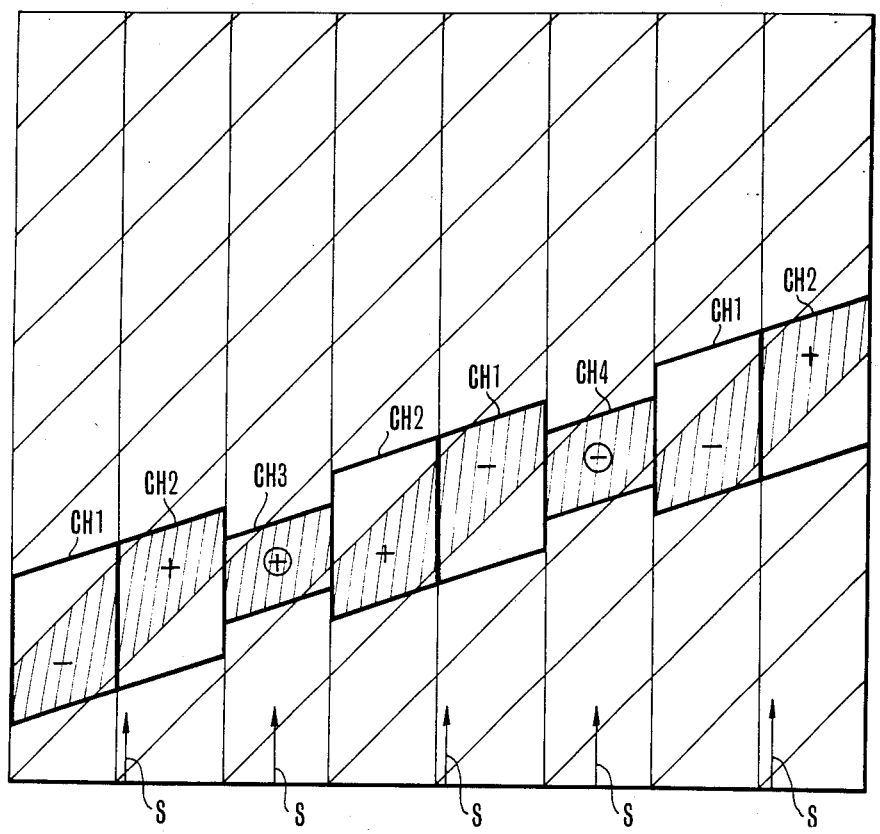
FIGS. 5 and 6 are illustrations of a manner in which the heads of the VTR perform a tracing action on a record bearing medium.

FIG. 4 shows the arrangement of the timing signal generating circuit 12 for the $\frac{1}{3}$ slow reproducing operation on the wider recording tracks. FIG. 5 shows the tracing action of the heads on the record bearing medium performed during normal reproduction. Referring to FIG. 4, the timing signal (a) is obtained by frequency dividing by $\frac{1}{3}$ the inverted output of the 30 PG signal produced from an inverter 21 by means of an exclusive logical sum circuit 22 (hereinafter referred to as EXOR circuit) and a binary counter 23. The timing signal (b) is obtained by taking the AND of the timing signal (a) and the 30 PG signal. The timing signal (c) is obtained from another EXOR circuit 25 which receives the timing signals (a) and (b) as two inputs thereof. The timing signal (d) is obtained from a NOR gate 26 which has the timing signal (a) and the 30 PG signal as two inputs thereof. The timing signal (e) is obtained from another NOR gate 27 which has the timing signals (d) and (a) as its two inputs. The sampling timing signal (f) is obtained by taking out the rising and falling endges of the timing signal (a) by means of a time constant circuit 31 and an EXOR 28, by taking out through a time constant circuit 32 and an EXOR circuit 29 the rising and falling edges of the output of a mono-stable multivibrator 33 (hereinafter referred to as MM) which is triggered by the above-stated edges and by obtaining the logical sum of the outputs of the EXOR's 28 and 29 by means of an OR gate 30.

Referring to FIG. 5, the axis of abscissa of the drawing shows a time base; the axis of ordinate shows the tape position in the longitudinal direction thereof; each of parallelograms shown in the drawing represents a recording track obliquely formed relative to the longitudinal direction of the tape; reference symbols CH1 to CH4 denote the tracing loci of the heads CH1 to CH4; and symbols S denote sampling pulses provided by the timing signal (f). As mentioned above, the heads CH1 to CH4 have different azimuth angles. Assuming that the head CH1 has a negative azimuth angle "−", the head CH2 has a positive azimuth angle "+". Assuming that the head CH3 has an azimuth angle ⊕, the head CH4 has another azimuth angle ⊖. Therefore, adjacent recording tracks have signals recorded therein by the heads of different azimuth angles, i.e. by the heads CH1 and CH2 or by the heads CH3 and CH4. As a result, a satisfactorily reproduced signal is obtained as represented by hatched parts in FIG. 5. In accordance with the above-stated arrangement of this embodiment, either the heads CH1 and CH3 or the heads CH2 and CH4 are selectively used in obtaining one field portion of the reproduced signal in the manner described.

Figure 6:
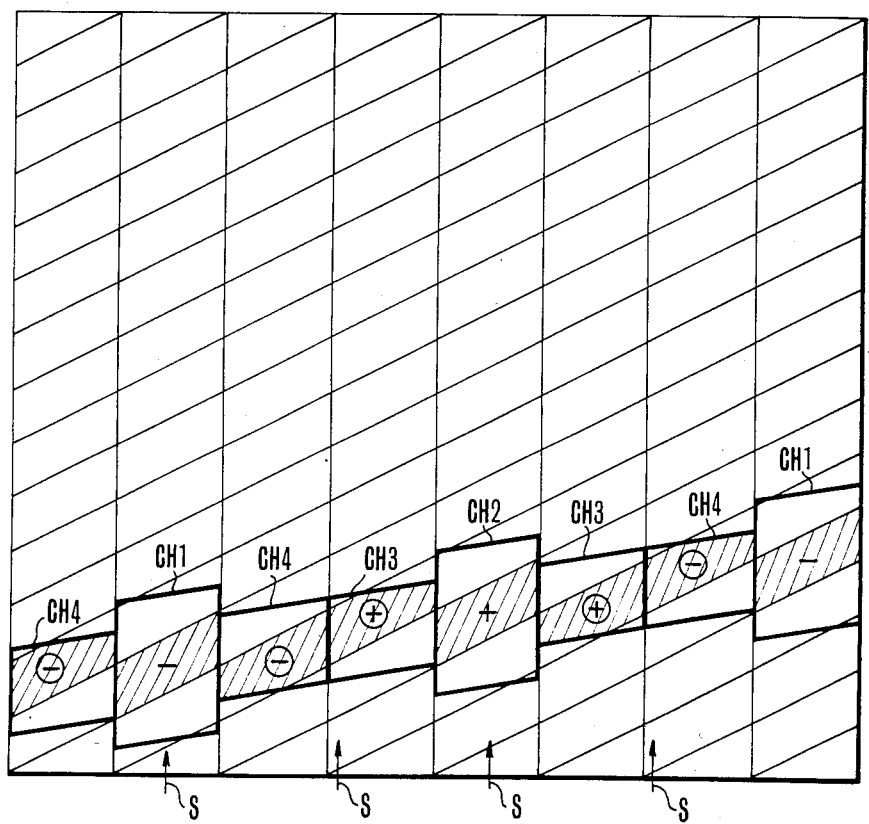

FIG. 6 shows a manner in which the heads traces the record bearing medium in performing a ⅓ slow motion reproducing operation on signals recorded in recording tracks with the narrower heads. In this instance, a satisfactorily reproduced signal is obtainable also by selectively using the heads CH1 and CH3 or the heads CH2 and CH4. Further, in this instance, any desired signal portion is reproducible from an applicable recording track by supplying the timing signals (b) and (c) and the timing signals (d) and (e) generated by the timing signal generating circuit 12 conversely to the switches 8 and 7 and to the switches 10 and 9 respectively.

As apparent from FIGS. 5 and 6, with the adjacent heads among four heads are selectively used, the reproduced signal is always obtainable at a high level even when the tape is allowed to continuously travel. In addition to this, the video signal never becomes discontinuous within each field, so that a slow motion reproducing operation can be accomplished in an excellent manner.

It is another advantage of the embodiment that the tracking control can be adequately accomplished by sample-and-holding the ATF signal at a timing preset according to the tape speed. As regards the tape travel speed for slow motion reproduction, any slow motion reproduction other than the ⅓ slow reproduction also can be adequately carried out by suitably changing the switch-over rotation of the reproducing heads and the sample-and-holding timing for the ATF signal as long as the tape speed does not exceed a limit within which the record of one track is reproducible with one and the same head (a speed not exceeding a speed three times as high as the tape speed employed in recording).

As mentioned in the foregoing, the VTR according to this invention is capable of obtaining adequately reproduced signals with simple arrangement irrespective of the travelling speed of the tape-shaped record bearing medium.

What is claimed is:

1. A rotary head type reproducing apparatus for reproducing information signals recorded in a plurality of recording tracks by tracing, with rotary type magnetic heads, the rectording tracks which are formed with said information signals on a tape-shaped magnetic record bearing medium in a direction of crossing the longitudinal direction of said medium, comprising:

(a) first and second pairs of magnetic heads, the heads of each pair: being positioned closer to each other than to the heads of the other pair; and being arranged to have different azimuth angles from each other;

(b) a rotary member arranged to have said first and second pairs of magnetic heads mounted on the circumference thereof;

(c) rotation period detecting means arranged to detect the rotation period of said rotary member and to produce a rotation period information signal corresponding to the rotation period detected; and (d) output selection means for selectively producing, according to said rotation period information signal, the information signals reproduced from said recording tracks by said pairs of magnetic heads through their tracing action on said tape-shaped recording bearing medium.

2. An apparatus according to claim 1, wherein said rotary member has a first of said magnetic heads of said first pair of heads arranged back to back deviating 180 degrees from a first of said heads of said second pair of heads and a second of said heads of said first pair of heads arranged back to back deviating 180 degrees from a second of said heads of said second pair of heads.

3. An apparatus according to claim 2, wherein said rotation period detecting means includes a rectangular wave signal generating circuit which is inverted at every half revolution of a pair of rotary heads.

4. An apparatus according to claim 3, wherein said output selection means includes a change-over circuit which is arranged to change the magnetic head used for reproducing the information signal recorded in said recording tracks from one over to another among said magnetic heads forming said pairs of magnetic heads every time said rectangular wave signal produced from said rectangular wave signal generating circuit is inverted.

5. An apparatus according to claim 4, wherein among said plurality of tracks formed with recorded information signals, adjacent tracks are magnetized in different directions.

6. An apparatus according to claim 5, wherein the heads of said first and second pairs of magnetic heads which deviate 180 degrees from each other have different azimuth angles from each other.

7. An apparatus according to claim 1, further comprising travel driving means for causing said tape shaped magnetic record bearing medium to travel in the longitudinal direction of said medium.

8. An apparatus according to claim 7, further comprising travelling speed control means arranged to control said travel driving means to cause said medium to travel at a given speed lower than a speed at which said medium is allowed to travel when said recording tracks are formed with said information signals.

9. A rotary head type reproducing apparatus for reproducing information signals recorded in a plurality of recording tracks by tracing, with rotary type magnetic heads, the recording tracks which are formed with said information signals on a tape-shaped magnetic record bearing medium in a direction of crossing the longitudinal direction of said medium, comprising:

(a) first and second pairs of magnetic heads, the heads of each pair: being positioned closer to each other than to the heads of the other pair; being arranged to have different widths from each other in a direction perpendicular to the medium tracing direction; and being arranged to have different azimuth angles from each other;

(b) a rotary member arranged to have said first and second pairs of magnetic heads mounted on the circumference thereof; and (c) output selection means arranged to select one of said magnetic heads forming said first and second pairs of magnetic heads and to produce as a reproduced signal the information signal which is recorded in said recording tracks and is reproduced from said tape-shaped magnetic record bearing medium by said magnetic head selected.

10. An apparatus according to claim 9, wherein the two heads of each of said first and second pairs of magnetic heads are arranged on said rotary member at a predetermined phase difference from each other.

11. An apparatus according to claim 10, wherein said rotary member has a first of said magnetic heads of said first pair of magnetic heads arranged on the circumference of said rotary member back to back deviating 180 degrees from a first of said heads of said second pair of magnetic heads and a second of said magnetic heads of said first pair of magnetic heads arranged on the circumference of said rotary member back to back deviating 180 degrees from a second of said heads of said second pair of magnetic heads; and, among said first and second pairs of magnetic heads, the heads having the same width in a direction perpendicualr to the medium tracing direction are arranged back to back deviating 180 degrees from each other on the circumference of said rotary member.

12. An apparatus according to claim 11, further comprising rotation period detecting means arranged to detect the rotation period of said rotary member and to produce a rectangular wave signal which is inverted at every half rotation of said rotary member.

13. An apparatus according to claim 12, wherein said output selection means includes a change-over circuit which is arranged to change the magnetic head to be used for reproducing said information signal recorded in said recording tracks from one over to another in a predetermined rotation among the four magnetic heads forming said first and second pairs of said magnetic heads every time said rectangular wave signal produced from said rotation period detecting means is inverted.

14. An apparatus according to claim 13, further comprising travel driving means for causing said tape-shaped magnetic record bearing medium to travel in the longitudinal direction thereof.

15. An apparatus according to claim 14, further comprising travelling speed control means arranged to control said travel driving means to cause said medium to travel at a given speed lower than a speed at which said medium is allowed to travel when said recording tracks are formed with said information signals.

16. An apparatus according to claim 15, wherein said change-over circuit is arranged such that, after two magnetic heads of wider width are consecutively selected according to said rectangular wave signal produced from said rotation period detecting means, one of the magnetic heads of narrower width is selected and, thereafter, the heads are repetitively selected in rotation in that order.

17. An apparatus according to claim 16, wherein said change-over circuit is arranged such that, after two magnetic heads of narrower width are consecutively selected according to said rectangular wave signal produced from said rotation period detecting means, one of the magnetic heads of wider width is selected and, thereafter, said magnetic heads are repetitively selected in rotation in that order.

18. An apparatus according to claim 17, wherein, among said plurality of recording tracks formed with recorded information signals, adjacent tracks are magnetized in different directions from each other.

19. A rotary head type reproducing apparatus for reproducing information signals from recording tracks by tracing with rotary type magnetic heads a tape-shaped magnetic record bearing medium on which said recording tracks are formed with said information signals at least either in the form of normal recording tracks in the longitudinal direction of said medium or in the form of long-time recording tracks having a narrower with than said normal recording tracks in the direction perpendicular to the longitudinal direction of said tracks, comprising:

(a) a rotary member which is arranged to be rotatable;

(b) first and second normal-recording-track reproducing magnetic heads which are mounted on the circumference of said rotary member and are arranged back to back deviating 180 degrees from each other;

(c) first and second long-time-recording-track reproducing magnetic heads which are mounted also on the circumference of said rotary member being arranged back to back deviating 180 degrees from each other, said first long-time-recording-track reproducing magnetic head being positioned closer to said first than said second normal-recording-track reproducing magnetic head and being of different azimuth angle than said first normal-recording-track reproducing head, and said second long-time-recording-track reproducing head being of different azimuth angle than said second normal-recording-track reproducing magnetic head, (d) medium travel driving means for causing said tape-shaped record bearing medium to travel in the longitudinal direction thereof; and (e) output selection means arranged to select either said normal-recording-track reproducing magnetic heads or said long-time-recording-track reproducing magnetic heads, when said tape-shaped magnetic record bearing medium is driven by said medium travel driving means to travel at such a speed that either said normal-recording-track reproducing heads or said long-time-recording-track reproducing heads are caused to trace said medium across or traversing a plurality of these recording tracks, and to allow said information signals which are recorded in said recording tracks on said medium and reproduced by said selected magnetic heads to be produced as a reproduced signal.

20. An apparatus according to claim 19, further comprising rotation period detecting means arranged to detect the rotation period of said rotary member and to generate a rectangular wave signal which is inverted at every half rotation of said rotary member.

21. An apparatus according to claim 20, wherein said two normal-recording-track reproducing heads are arranged to have different azimuth angles from each other.

22. An apparatus according to claim 21, wherein said two long-time-recording-track reproducing magnetic heads are arranged to have different azimuth angles from each other.

23. An apparatus according to claim 22, wherein said output selecting means includes a change-over circuit which is arranged to change the magnetic head used for reproducing said information signal recorded in said recording tracks from one over to another in a predetermined sequence of rotation, among said normal-recording-track reproducing magnetic head and said long-time-recording-track reproducing magnetic heads, every time said rectangular wave signal produced from said rotation period detecting means is inverted.

24. An apparatus according to claim 23, wherein said change-over circuit is arranged to perform the change-over action thereof on three magnetic heads in one round of rotation among said two normal-recording-track reproducing heads and said two long-time-recording-track reproducing heads.

25. An apparatus according to claim 23, further comprising travelling speed control means for controlling said medium travel driving means to cause said tape-shaped magnetic record bearing medium to travel at a given speed lower than a speed which is employed when said recording tracks are formed with said information signals.

26. An apparatus according to claim 25, wherein said change-over circuit is arranged such that, in reproducing recorded signals from said normal recording tracks formed on said tape-shaped magnetic record bearing medium, said two normal-recording-track reproducing magnetic heads of different azimuth angles are first consecutively selected according to the rectangular wave signal produced from said rotation period detecting means and then one of said two long-time-recording-track reproducing magnetic heads is selected and, thereafter, the change-over selection of heads is repeated in rotation in the same order.

27. An apparatus according to claim 25, wherein said change-over circuit is arranged such that, in reproducing recorded signals from said normal recording tracks formed on said tape-shaped magnetic record bearing medium, said two normal-recording-track reproducing magnetic heads of different azimuth angles are first consecutively selected according to the rectangular wave signal produced from said rotation period detecting means and then one of said two long-time-recording-track reproducing magnetic heads having the same azimuth angle as that of the head selected immediately before is selected and the change-over selection of a reproducing head is thereafter repeated in the same order of rotation.

28. An apparatus according to claim 27, wherein said change-over circuit is arranged to perform said change-over selection in such a manner that one of said normal-recording-track reproducing heads which is selected immediately following said long-time-recording-track reproducing head is of the same azimuth angle as that of said long-time-recording-track reproducing head.

29. An apparatus according to claim 25, wherein said change-over circuit is arranged such that, in reproducing recorded signals from said long time recording tracks formed on said tape-shaped magnetic record bearing medium, said two long-time-recording-track reproducing magnetic heads of different azimuth angles are first consecutively selected according to the rectangular wave signal produced from said rotation period detecting means and then one of said two normal-recording-track reproducing magnetic heads is selected and the change-over selection of a reproducing head is thereafter repeated in rotation in the same order.

30. An apparatus according to claim 25, wherein said change-over circuit is arranged such that, in reproducing recorded signals from said long time recording tracks formed on said tape-shaped magnetic record bearing medium, said two long-time-recording-track reproducing magnetic heads of different azimuth angles are first consecutively selected according to the rectangular wave signal produced from said rotation period detecting means and then one of said two normal-recording-track reproducing heads which is of the same azimuth angle as that of the head selected immediately before is selected and the change-over selection of a reproducing head is thereafter repeated in the same order of rotation.

31. An apparatus according to claim 30, wherein said change-over circuit is arranged to perform said change-over selection in such a manner that one of said long-time-recording-track reproducing magnetic heads which is selected immediately following said normal-recording-track reproducing magnetic head is of the same azimuth angle as that of said normal-recording-track reproducing magnetic head.

32. An apparatus according to claim 25, wherein said travelling speed control means is arranged to control said medium travel driving means to cause said tape-shaped magnetic record bearing medium to travel at a speed which is $\frac{1}{3}$ of a speed employed when said recording tracks are formed with said information signals.

* * * * *